US 6,545,668 B1

(12) United States Patent
Hayama

(10) Patent No.: US 6,545,668 B1
(45) Date of Patent: Apr. 8, 2003

(54) KEYBOARD WITH DETACHABLY ATTACHED UNIT HAVING MULTIMEDIA KEY FUNCTION

(75) Inventor: Masanobu Hayama, Tokyo (JP)

(73) Assignee: Fujitsu Takamisawa Component Ltd., Tokyo (JP)

( * ) Notice: Subject to any disclaimer, the term of this patent is extended or adjusted under 35 U.S.C. 154(b) by 0 days.

(21) Appl. No.: 09/495,308

(22) Filed: Feb. 1, 2000

(30) Foreign Application Priority Data

Jul. 22, 1999 (JP) .......................................... 11-208015

(51) Int. Cl.[7] ................................................ G09G 5/00
(52) U.S. Cl. ........................ 345/172; 345/168; 345/169
(58) Field of Search ................................. 345/172, 109, 345/168; 235/146, 145 A; 341/22, 28

(56) References Cited

U.S. PATENT DOCUMENTS

| 4,313,227 A | * | 1/1982 | Eder ........................... 359/142 |
| 4,689,761 A | * | 8/1987 | Yurchenco ................... 361/680 |
| 4,937,778 A | * | 6/1990 | Wolf et al. .................... 710/67 |
| 5,063,376 A | * | 11/1991 | Chang ......................... 345/169 |
| 5,220,521 A | * | 6/1993 | Kikinis ........................ 708/138 |
| 5,402,121 A | * | 3/1995 | Noorbehesht ................ 341/26 |
| 5,689,253 A | * | 11/1997 | Hargreaves et al. .......... 341/22 |
| 5,717,430 A | * | 2/1998 | Copland et al. ............. 345/168 |
| 5,892,503 A | * | 4/1999 | Kim ............................ 345/168 |
| 6,009,164 A | * | 12/1999 | Yun ............................ 379/368 |
| 6,011,495 A | * | 1/2000 | Chen ........................... 341/22 |
| 6,040,977 A | * | 3/2000 | Hoffer ......................... 361/680 |
| 6,268,806 B1 | * | 7/2001 | Frager et al. ................. 341/22 |
| 6,307,534 B1 | * | 10/2001 | Honjyou ...................... 345/156 |
| 6,380,924 B1 | * | 4/2002 | Yee et al. .................... 345/156 |
| 6,445,381 B1 | * | 9/2002 | Chou .......................... 345/168 |

* cited by examiner

Primary Examiner—Steven Saras
Assistant Examiner—Leland R. Jorgensen
(74) Attorney, Agent, or Firm—Staas & Halsey LLP

(57) ABSTRACT

A keyboard, which comprises a main keyboard unit, and an auxiliary keyboard unit having a multimedia key function, through which various functions, which can be realized by using a computer, and execution of application programs, which can be executed by using the computer, are directly achieved by a key operation as multimedia functions. The auxiliary keyboard unit is detachable from the main keyboard unit.

17 Claims, 11 Drawing Sheets

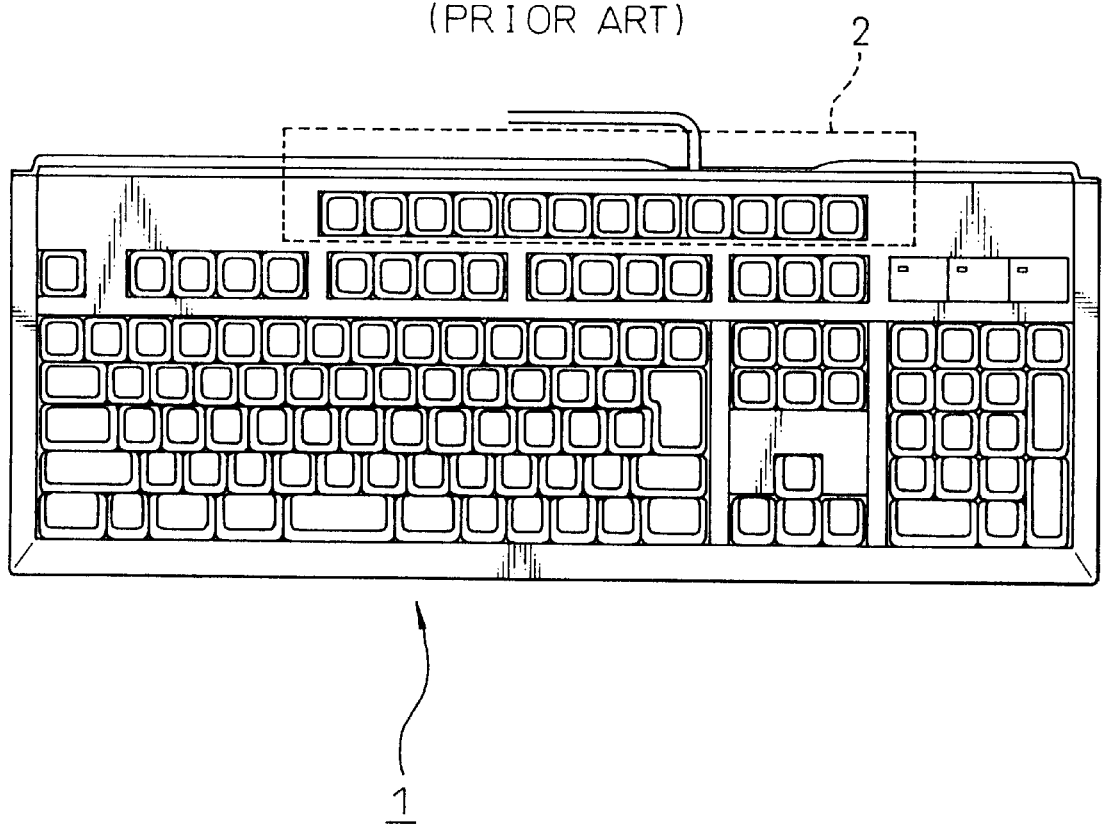

| MULTIMEDIA KEY CODES | FUNCTION OPERATIONS |
|---|---|
| E0, 01 | REPRODUCTION OF CD/DVD |
| E0, 02 | MUTING |
| E0, 03 | HALTING OF REPRODUCTION OF CD/DVD |
| E0, 04 | FAST-FORWARD OPERATION |
| E0, 05 | REVERSE OPERATION |
| E0, 06 | ACTIVATION OF APPLICATION PROGRAM (NOTEPAD PROGRAM) |
| E0, 07 | ACTIVATION OF APPLICATION PROGRAM (PAINT PROGRAM) |

KEYBOARD WITH DETACHABLY ATTACHED UNIT HAVING MULTIMEDIA KEY FUNCTION

BACKGROUND OF THE INVENTION

1. Field of the Invention

The present invention generally relates to a keyboard serving as input means for a computer and, more particularly, to a multimedia keyboard through which multimedia functions, such as a reproduction of CD (compact disk) or DVD (digital video disk), controlling sound volume, connection to the Internet, transmitting and receiving of electronic mail, activation of various application programs, and starting and termination of a system, are directly performed by key operations.

2. Description of the Related Art

In recent years, computers have come to be widely utilized with significant progress in the processing performance thereof. There are various ways of using a computer which include not only use of ordinary word-processing and calculating programs but reproduction of audio or image signals from CD or DVD, image processing, utilization of the Internet, and transmitting/receiving of electronic mail (or e-mail). Further, it is considered that the utilization of computers as household electrical appliances and the systematization thereof will be accelerated still more, and that computers and various kinds of household electrical appliances may be used in the future in such a way as to be integral with one another.

In a computer system integrated into a multimedia system in such a manner, generally, each operation of activating and inactivating various kinds of multimedia functions is achieved by pressing down a combination of ordinary keys (for example, keys of a Japanese 109 Keyboard) serving as input means for a computer or by using a pointing device, such as a mouse or a track ball, to thereby position a cursor on a desired icon on the screen of a display device.

Further, in recent years, there have been used multimedia keys adapted to directly cause the activation or inactivation of, especially, multimedia functions. Generally, such multimedia keys are preliminarily built into a part of a main unit of a personal computer or into a part of a keyboard.

Moreover, it is usual that a multimedia key portion is built into a part of a main unit of a notebook-sized personal computer.

The appearance of such a conventional multimedia keyboard is larger than that of a standard keyboard by the size of a multimedia key portion. Further, because the multimedia key portion is built into the multimedia keyboard, the multimedia key portion cannot be detached therefrom even when the multimedia key portion is not used. Therefore, the conventional multimedia keyboard is disadvantageous in the occupied area or footprint, as compared with the standard keyboard.

Moreover, when the multimedia key function is utilized in a conventional desktop personal computer having no multimedia keys in a main unit thereof, it is sufficient to replace a standard keyboard with a multimedia keyboard. However, a conventional notebook-sized personal computer having no multimedia keys in a main unit thereof needs to utilize a large multimedia keyboard externally attached thereto. Thus, such a conventional notebook-sized personal computer is inefficient in space utilization.

Accordingly, an object of the present invention is to provide a multimedia keyboard having a small occupied space, to which a unit having a multimedia function is detachably attached.

SUMMARY OF THE INVENTION

To achieve the foregoing object, according to the present invention, there is provided a keyboard which comprises a main keyboard unit, and an auxiliary keyboard unit having a multimedia key function, through which various functions, which can be realized by using a computer, and execution of application programs, which can be executed by using the computer, are directly achieved by a key operation as multimedia functions. Further, the auxiliary keyboard unit is detachable from the main keyboard unit.

According to the present invention, the auxiliary keyboard unit having the multimedia key function is detachable from the keyboard. For example, in the case that the multimedia key function is not utilized, the auxiliary keyboard unit can be detached from the main keyboard unit, if necessary. Thus, space-saving is achieved.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 1 is a diagram illustrating a conventional multimedia keyboard having a multimedia key portion;

DETAILED DESCRIPTION OF THE PREFERRED EMBODIMENTS

Before proceeding to the detailed description of the preferred embodiments of the present invention, a prior art multimedia keyboard will be described hereinbelow with reference to the accompanying drawings, for clarifying the differences between the prior art and the present invention.

FIG. 1 is a diagram illustrating a conventional multimedia keyboard having a multimedia key portion. As illustrated in FIG. 1, a multimedia key portion 2 is provided in a part of a standard keyboard (i.e., keys of a commercially available keyboard) key arrangement at an upper portion of the conventional multimedia keyboard 1. Many function operations of the multimedia key function, such as reproduction of a CD or a DVD, controlling the sound volume of a loudspeaker, connection to the Internet, transmitting and receiving of electronic mail, activation of various application programs, and starting and termination of a system, can be allocated to the multimedia keys of the multimedia key portion 2. Manipulation of such multimedia keys enables easy and speedy utilization of various kinds of multimedia functions without operating icons on the screen of a display device by manipulating a mouse, and without ordinary keyboard operation.

Figure 2A:
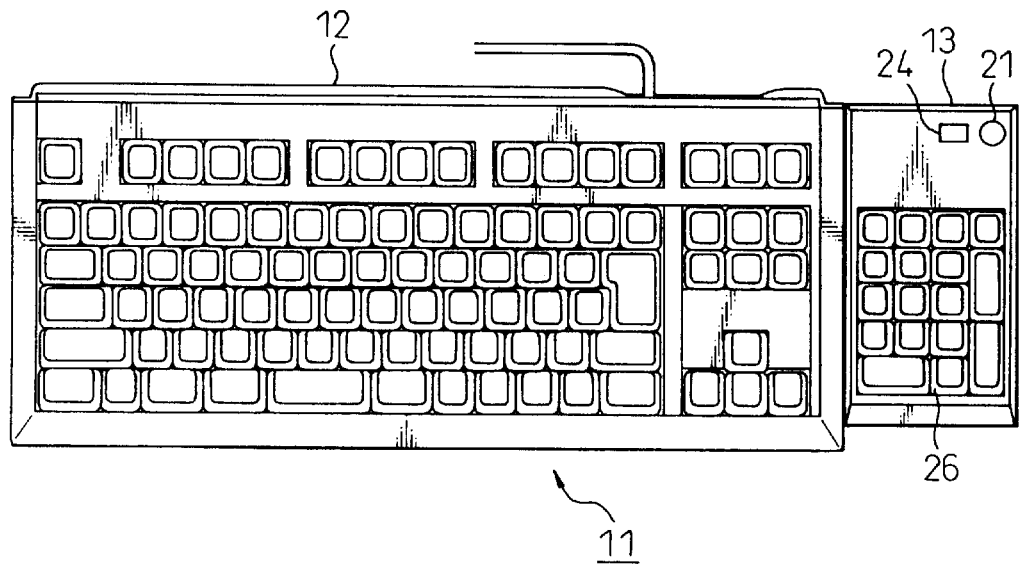
FIGS. 2a and 2b are diagrams each illustrating the principle of a multimedia keyboard that is a first embodiment of the present invention.
Figure 2B:
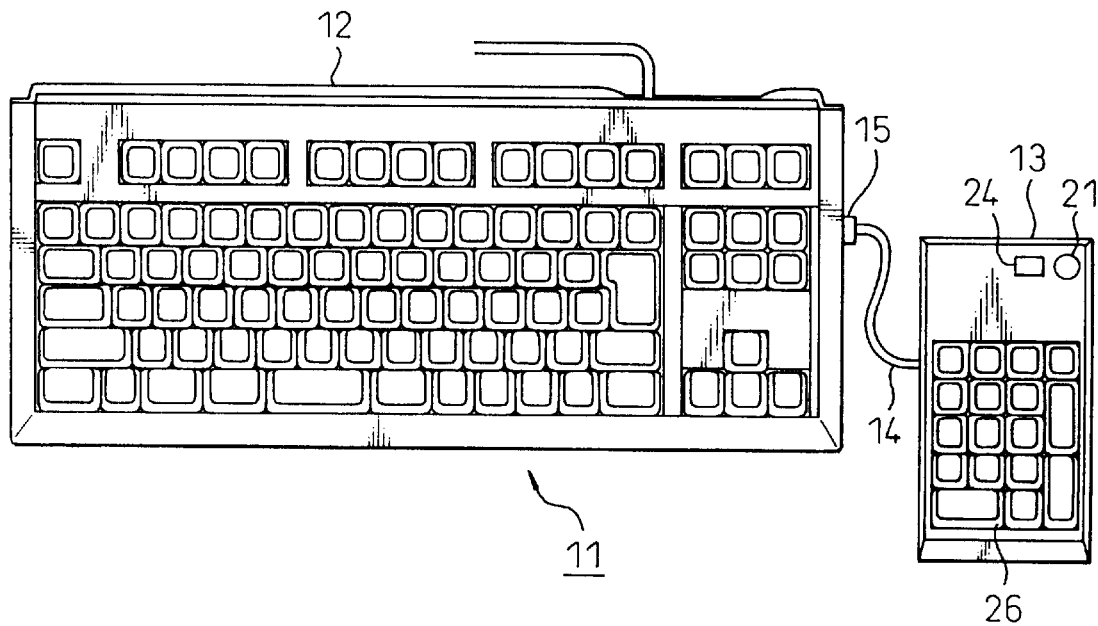
Figure 3:
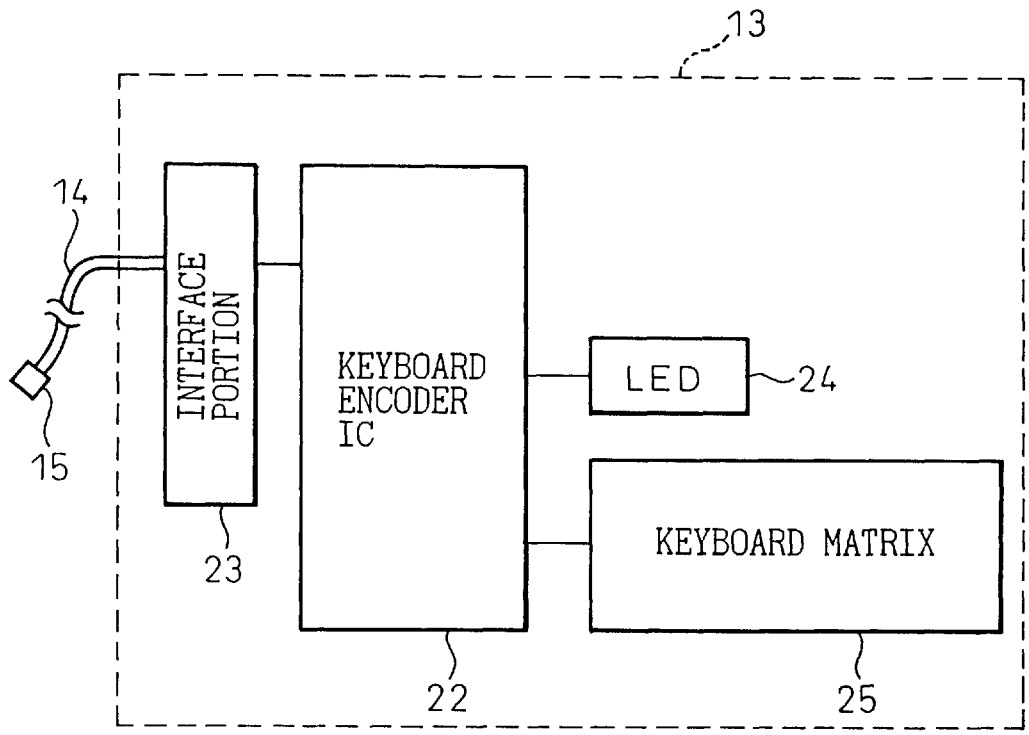
FIG. 3 is a block diagram illustrating the constitution of a circuit in a ten key unit of the first embodiment of the present invention.

FIGS. 2a and 2b are diagrams illustrating the principle of a multimedia keyboard that is a first embodiment of the present invention. FIG. 3 is a diagram illustrating the constitution of a circuit in a ten key unit of the first embodiment of the present invention.

A first multimedia keyboard of the present invention has a ten key operation mode, in which the ten keys are used for inputting numeric characters, and a multimedia key operation mode in which the ten keys are used for performing the multimedia key functions.

As illustrated in FIG. 2a, a multimedia keyboard 11 of this embodiment has a ten key unit 13 serving as an auxiliary keyboard, and a main keyboard unit 12 that is the rest of the keyboard other than the ten key unit 13. This ten key unit 13 has a mode switching key 21 and an LED (light-emitting diode) 24, in addition to the ten key 26.

As illustrated in FIG. 2b, the ten key unit 13 and the main keyboard unit 12 are connected to each other through a general interface cable 14, such as a universal serial bus (USB) cable or a personal system/2 (PS/2) interface cable. The general interface cable 14 has a connector 15, by which the connection between the ten key unit 13 and the main keyboard unit 12 can be released.

As illustrated in FIG. 3, the ten key unit 13 comprises a keyboard encoder IC 22, an interface portion 23, an LED 24, and a keyboard matrix 25.

Each time the mode switching key 21 is depressed, an operation mode of the ten key unit 13 is switched between an ordinary ten key operation mode and a multimedia key operation mode (namely, toggling of the operation mode is performed).

The LED 24 is operative to indicate the state of the operation mode of the ten key unit 13. In this embodiment, the LED 24 is turned on in the case of the multimedia key operation mode, while the LED 24 is turned off in the case of the ten key operation mode. Incidentally, the turn on/off of the LED 24 may be assigned to the ten key operation mode and the multimedia key operation mode, respectively, in a reverse manner, differently from the case of this embodiment. Further, although the LED is used for indicating the state of the operation mode in this embodiment, alternative display means using, for instance, a liquid crystal may be used. Alternatively, the state of the operation mode may be displayed on the screen of the display device.

The general interface cable 14 is connected to the interface portion 23. The ten key unit 13 is connected to the main keyboard 12 by connecting the connector 15 to a corresponding connector provided in the main keyboard 12 of FIGS. 2a and 2b. Electric power for operating each of the circuits in the ten key unit 13 is supplied from the main keyboard 12 through the general interface cable 14.

A high-speed infrared wireless connection may be established as an alternative to the method of connection between the main keyboard unit 12 and the ten key unit 13, by providing an infrared light emitting portion and an infrared light receiving portion on a side surface portion of each of the units. In this case, the infrared light emitting portion and the infrared light receiving portion are provided in the interface portion 23.

Further, a radio wave wireless connection may be established by providing an antenna therein. In such an alternative, an independent power supply, such as a battery or a solar cell, is also provided in the ten key unit 13.

A fitting means (not shown) is provided in a side surface portion of each of the main keyboard unit 12 and the ten key unit 13. As illustrated in FIG. 2a, the keyboard units 12 and 13 can be fixed to each other by using the fitting means. Furthermore, connectors for the fitting means and the general interface cable may be provided at plural places on each of the keyboard units 12 and 13. In this case, the degree of flexibility in connection and placement of each of the keyboard units increases. Moreover, other bonding means, such as a magnet, adhesive tape, Velcro tape, or a suction cup, may be used as alternatives to the fitting means.

The ten key unit 13 is easily detached from the main keyboard unit 12 only by releasing the connection established by the fitting means and the general interface cable 14. In the case that numeric characters are to be inputted when the ten key unit 13 is detached therefrom, a user has only to use numerical keys generally referred to as "E-line" on the main keyboard unit 12, or to utilize what is called a Numlock function.

The keyboard encoder IC 22 is operative to perform an encoding operation in response to the depression of each of the keys detected by key scanning, which is performed by the, keyboard matrix 25, from the ten keys 26 and the mode switching key 21 in the ten key unit 13.

Figure 4:
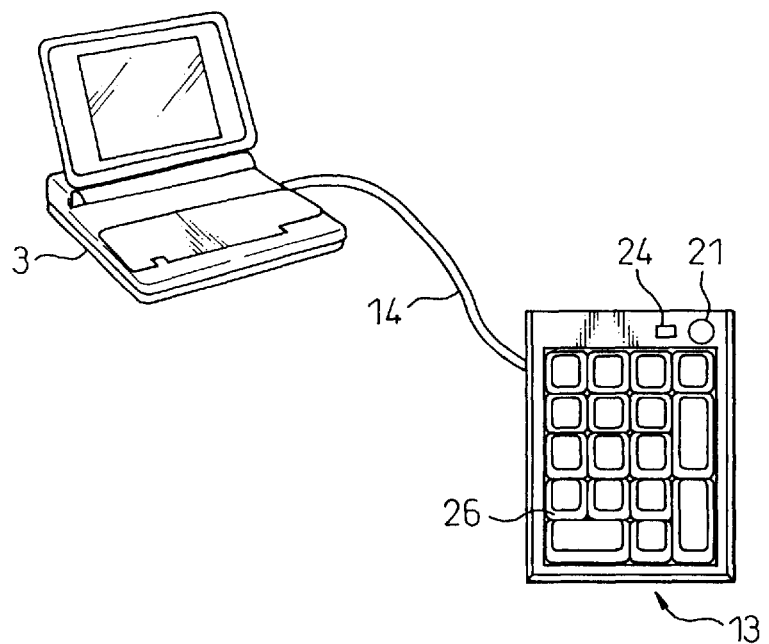
FIG. 4 is a diagram illustrating the connection between the ten key unit and the notebook-sized personal computer.

FIG. 4 is a diagram illustrating the connection between the ten key unit and the notebook-sized personal computer.

The ten key unit 13 of this embodiment contains the keyboard encoder IC 22 and the keyboard matrix 25, independent of the main keyboard unit 12. Thus, after the connection between the ten key unit 13 and the main keyboard unit 12 is released, the ten key unit 13 may be connected to an existing notebook-sized personal computer 3 through the general interface cable 14. Thus, according to the present invention, the ten key unit 13 is effectively utilized.

Next, the operating principle of the multimedia keyboard, which is the first embodiment of the present invention, will be described hereinbelow. In this embodiment, the ten key unit 13 is operative to switch the operation mode between the ten key operation mode and the multimedia operation mode, and to output a key code corresponding to each of the operation modes. In the computer, a keyboard driver is preliminarily installed in, for example, a hard disk. When a system power supply is turned on, the key driver is loaded from the hard disk to a work memory. Then, according to each of the key codes transmitted from the ten key unit 13, a corresponding operation is performed. When the system power supply is turned off, the key driver stored in the work memory is deleted.

Figure 5:
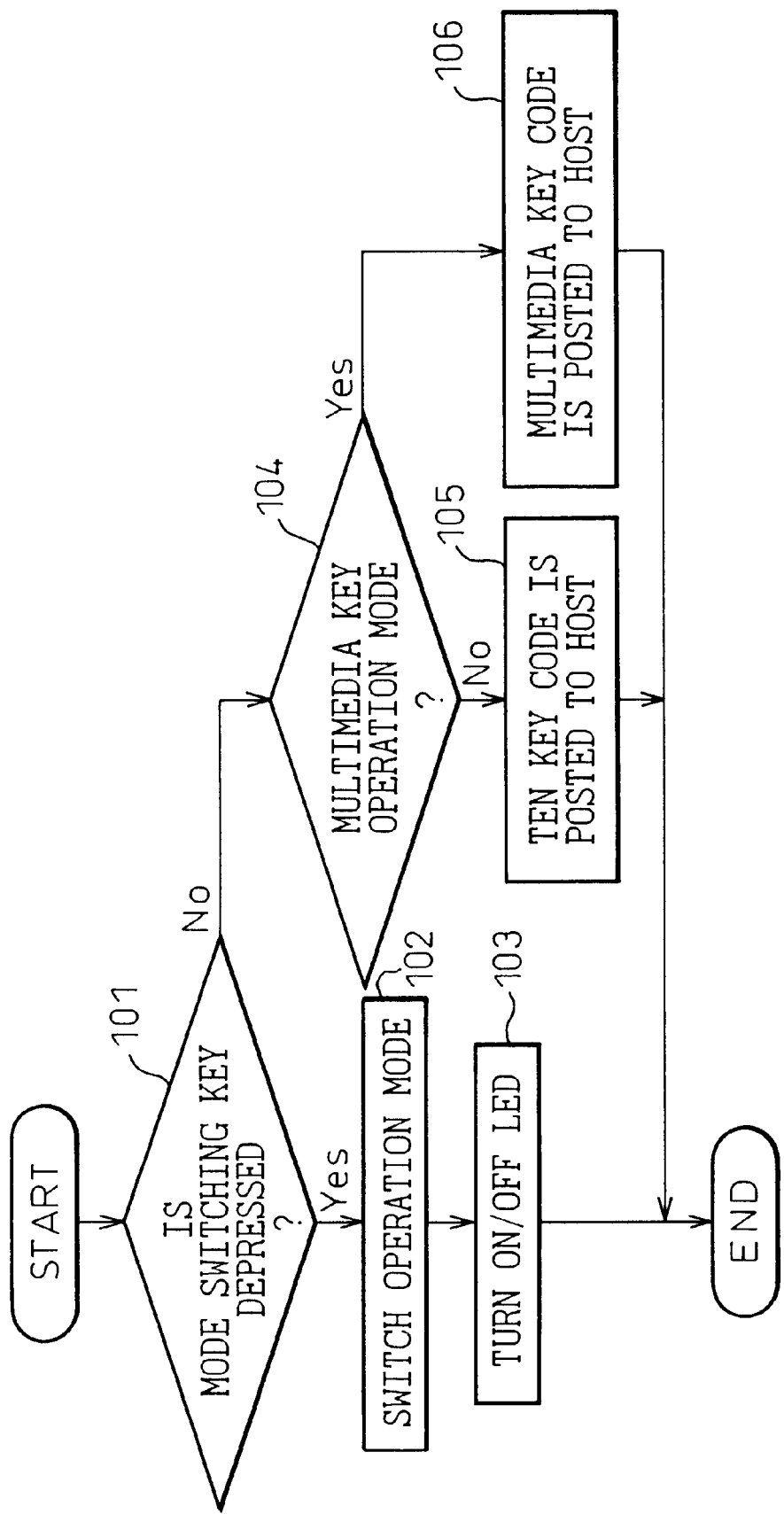
FIG. 5 is a flowchart illustrating the operating principle of the ten key unit of the first embodiment of the present invention.

FIG. 5 is a flowchart illustrating the operating principle of the ten key unit of the first embodiment of the present invention.

As described above, the keyboard matrix 25 performs key scanning on all the keys of the ten key unit 13. When one of the keys is depressed, the keyboard encoder IC 22 decides whether the depressed key is the mode switching key 21 or an ordinary ten key. If the IC 22 decides that the mode switching key 21 is depressed, the operation mode is switched at step 102 between the multimedia key operation mode and the ten key operation mode.

In response to this, at step 103, the LED 24 is turned on when the operation mode is changed to the multimedia key operation mode. Conversely, the LED 24 is turned off when the operation mode is changed to the ten key operation mode. Incidentally, each of the turning on/off of the LED 24 may be assigned to the other of a corresponding one of the operation modes to which the turning on/off of the LED 24 are respectively assigned as described above.

If the keyboard encoder IC 22 decides at step 101 that the depressed key is an ordinary ten key 26, control advances to step 104 whereupon a current operation mode of the ten key unit 13 is determined. If the current operation mode is the ten key operation mode, the ten key code is posted to a central processing unit (CPU (hereunder referred to as a host)) in a main unit of the computer (at step 105). Conversely, if the operation mode is the multimedia key operation mode, a multimedia key code is posted to the host (at step 106).

Thus, the ten key unit 13 of this embodiment has the multimedia key function.

Figures 6, 7:
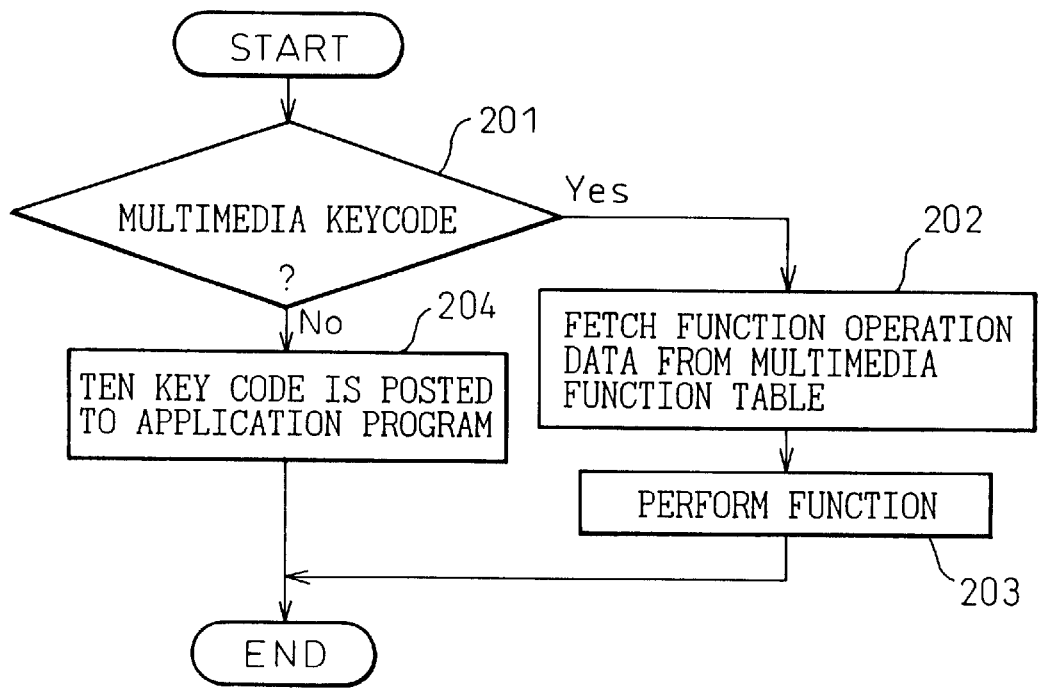
FIG. 6 is a flowchart illustrating the operating principle of a keyboard driver of the first embodiment of the present invention.
FIG. 7 is a diagram illustrating a multimedia function table used in the first embodiment of the present invention.

FIG. 6 is a flowchart illustrating the operating principle of the keyboard driver of the first embodiment of the present invention. FIG. 7 is diagram illustrating a multimedia function table of the first embodiment of the present invention.

The multimedia function table is saved in a rewritable storage medium. Further, various function operations respectively corresponding to the multimedia key codes are stored in this table. As shown in FIG. 7, the function operations are, for example, operations relating to the playing of a CD or DVD, that is, reproduction of a CD or DVD, muting, halting of the reproduction of the CD or DVD, fast-forward and reverse operations, and activations of various application programs. The function operations can be added or deleted by exchanging a read-only memory (ROM) or by being edited with the aid of software programs. The multimedia function table is read from the storage medium at each activation of the system. The function operations defined in the table at that moment are effective.

Moreover, in the rewritable storage medium in the host, setting information on the ten key operation mode and the multimedia key operation mode is saved. In the case of this embodiment, an operation mode to be activated at the time of turning on the system power supply can be set. For instance, user can set an operation mode at the time of activating the system. Alternatively, the keyboard may be set so that an operation mode at the time of turning off the system power supply is activated.

Incidentally, as described above, in the case that the ten key unit 13 of this embodiment is connected to an existing notebook-sized personal computer, the ten key unit is used by preliminarily installing the keyboard driver, the multimedia function table, and the setting information in the notebook-sized personal computer that is the host.

As illustrated in FIG. 6, first, at step 201, the keyboard driver decides whether the key code received by the host is a multimedia key code or a ten key code.

If it is decided at step 201 that the received key code is the multimedia key code, data representing the corresponding function operation is read from the multimedia function table of FIG. 7. Then, the host performs the function operation according to the data representing this function operation at step 203. For example, when the multimedia code E0, 06 is received, data representing the corresponding function operation, namely, "the activation of the application program (notepad program)" is read from the multimedia function table at step 202. Subsequently, the "notepad" program is executed at step 203.

Conversely, if it is decided in step 201 that the received key code is the ten key code, the ten key code is posted to the application program at step 204.

As described above, the first embodiment of the present invention has the ten key operation mode and the multimedia key operation mode, so that the tem key unit for realizing the multimedia key function is detachable therefrom. Thus, for instance, when the multimedia key function is not utilized, the ten key unit is detached therefrom, if necessary. Consequently, space-saving is achieved. Further, the detached unit having the multimedia key function is effectively utilized by being connected to a notebook-sized personal computer. Thus, this embodiment is very efficient.

Figure 8:
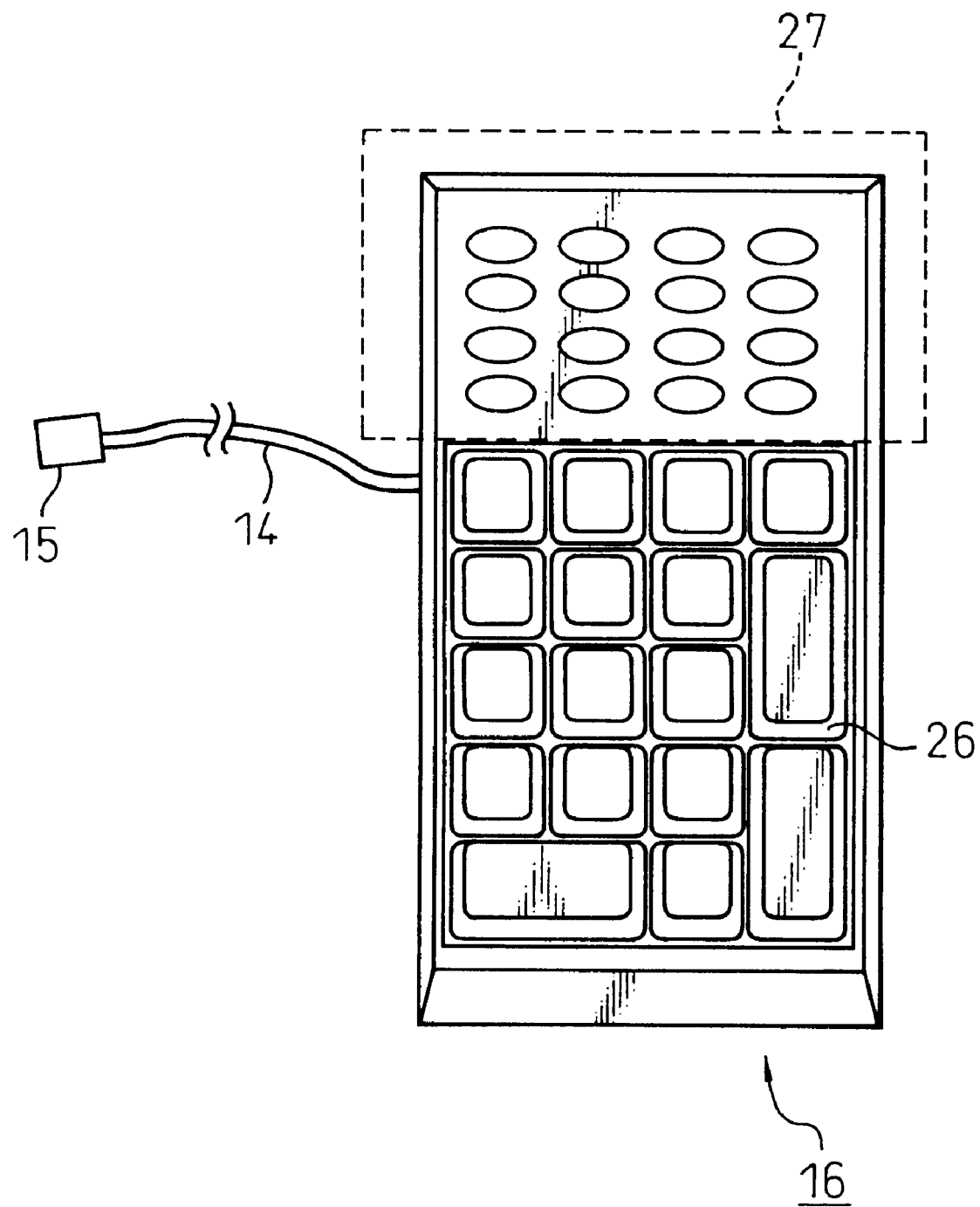
FIG. 8 is a diagram illustrating a ten key unit of a second embodiment of the present invention.
Figure 9:
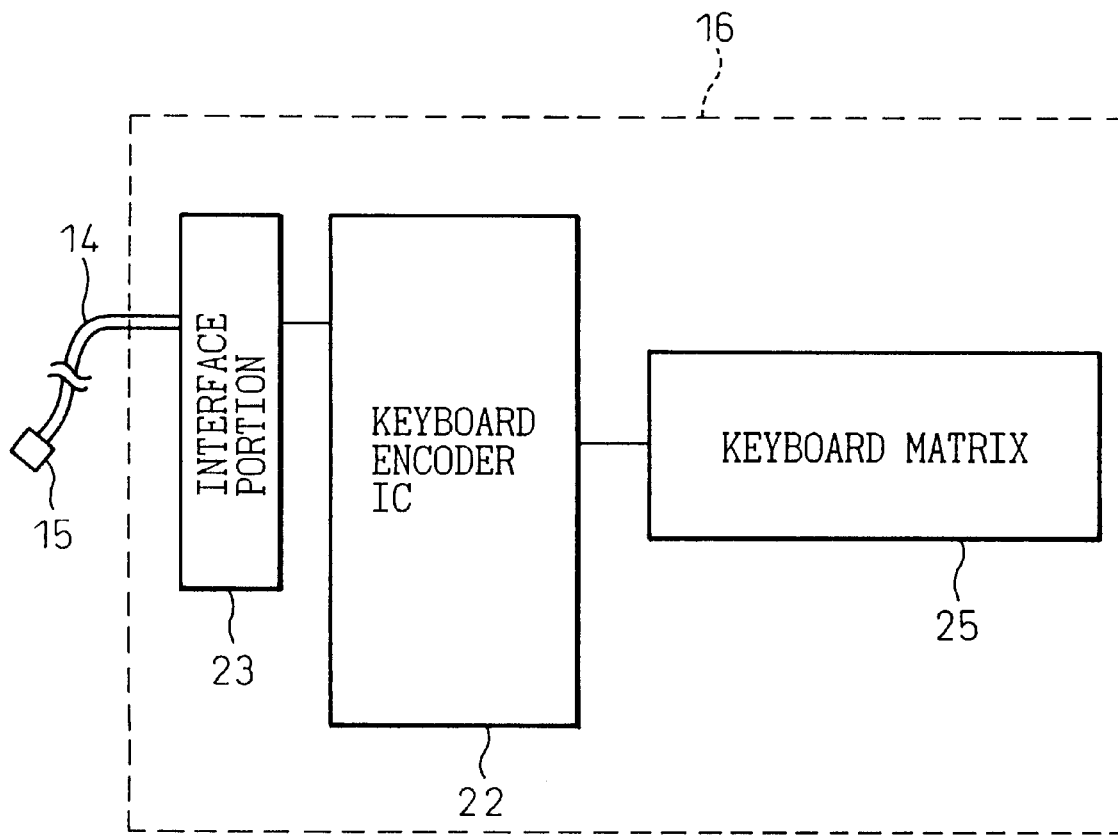
FIG. 9 is a block diagram illustrating the constitution of a circuit in a ten key unit of the second embodiment of the present invention.

FIG. 8 is a diagram illustrating a ten key unit of a second embodiment of the present invention. FIG. 9 is a block diagram illustrating the constitution of a circuit in the ten key unit of the second embodiment of the present invention.

A ten key unit 16 of the second embodiment of the present invention is an alternative to the ten key unit 13 of the first embodiment of the present invention. Similarly as in the case of the first embodiment, the multimedia keyboard 11 is constituted by connecting the ten key unit 16 to the main keyboard unit 12 through the general interface cable 14, such as the USB or PS/2 cable. The ten key unit 16 of the second embodiment has ten keys 26 and dependent multimedia keys 27.

The ten key unit 16 contains a keyboard encoder IC 22, an interface portion 23, an LED 24, and a keyboard matrix 25.

The general interface cable 14 is connected to the interface portion 23. Similarly as in the case of the first embodiment, the ten key unit 16 is connected to the main keyboard 12 by connecting the connector 15 to a corresponding connector provided in the main keyboard 12 of FIGS. 2a and 2b. Electric power for operating each of the circuits in the ten key unit 16 is supplied from the main keyboard 12 through the general interface cable 14.

A high-speed infrared wireless connection may be established as an alternative to the method of connection between the main keyboard unit 12 and the ten key unit 16, by providing an infrared light emitting portion and an infrared light receiving portion on a side surface portion of each of the units. In this case, the infrared light emitting portion and the infrared light receiving portion are provided in the interface portion 23. Further, a radio wave wireless connection may be established by providing an antenna therein. In such a case, an independent power supply, such as a battery or a solar cell, is further provided in the ten key unit 16.

A fitting means (not shown) is provided in a side surface portion of each of the main keyboard unit 12 and the ten key unit 16. As in the case of the first embodiment, the keyboard units 12 and 16 can be fixed to each other by using the fitting means. Furthermore, connectors for the fitting means and the general interface cable may be provided at plural places on each of the keyboard units 12 and 16. In this case, the degree of flexibility in connection and placement of each of the units increases. Moreover, bonding means, such as a magnet, adhesive tape, Velcro tape, or a suction cup, may be used as alternatives to the fitting means.

The ten key unit 16 is easily detached from the main keyboard unit 12 by releasing the connection established by the fitting means and the general interface cable 14.

In the second embodiment, the keyboard encoder IC 22 is operative to perform an encoding operation in response to the depression of each of the keys detected by key scanning, which is performed by the keyboard matrix 25, from the ten keys 26 and the multimedia keys 27 in the ten key unit 16.

The ten key unit 16 of this embodiment contains the keyboard encoder IC 22 and the keyboard matrix 25, independent of the main keyboard unit 12. Thus, after the connection between the ten key unit 16 and the main keyboard unit 12 is released, the ten key unit 16 may be connected to an existing notebook-sized personal computer 3 through the general interface cable 14.

Figure 10:
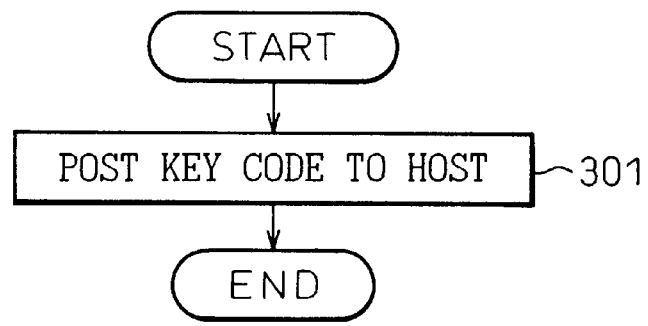
FIG. 10 is a flowchart illustrating the operating principle of the ten key unit of the second embodiment of the present invention;.

FIG. 10 is a diagram illustrating the operating principle of the ten key unit of the second embodiment of the present invention.

As described above, the keyboard matrix 25 performs key scanning on all the keys of the ten key unit 16. When one of the keys is depressed, the keyboard encoder IC 22 posts a key code corresponding to the depressed key in step 301.

In the host, a keyboard driver, a multimedia function table, and setting information are preliminarily installed, similarly as in the case of the first embodiment illustrated in FIGS. 6 and 7. Further, according to each of the key codes transmitted from the ten key unit 16, a corresponding operation is performed. Incidentally, in the case of connecting the ten key unit 16 of this embodiment to an existing notebook-sized personal computer, the keyboard driver, the multimedia function table, and the setting information are preliminarily installed in a host of the notebook-sized personal computer.

Figure 11:
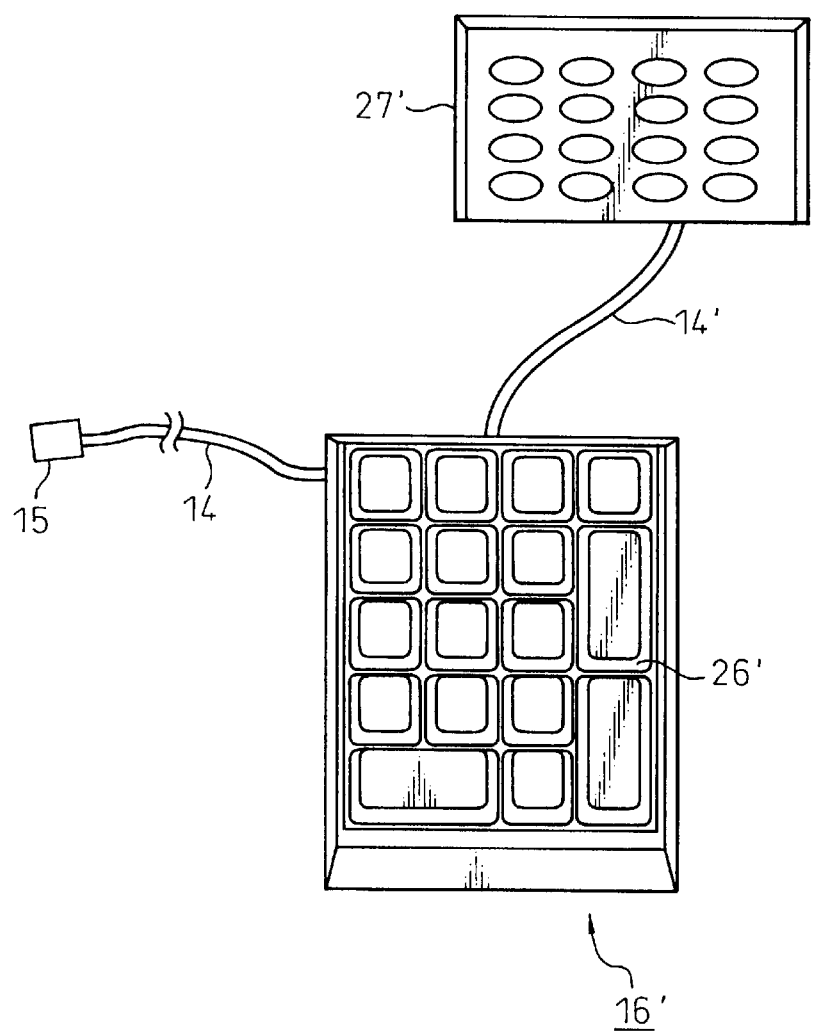
FIG. 11 is a diagram illustrating a third embodiment of the present invention.

FIG. 11 is a diagram illustrating a third embodiment of the present invention.

A multimedia key unit 27' of the third embodiment of the present invention is obtained by changing the multimedia key unit 27 of the second embodiment in such a manner as to be detachable from the ten key unit. Further, a ten key unit 16' is constituted by connecting the multimedia key unit 27' to a ten key portion 26' through a general interface cable 14', such as a USB cable or a PS/2 interface cable.

Each of the multimedia key unit 27' and the ten key portion 26' has a constitution similar to that of FIG. 9 and contains a keyboard encoder IC, an interface portion, and a keyboard matrix.

The interface portion of the multimedia key unit 27' is also connected to the general interface cable 14'. Electric power for operating the circuits in the multimedia key unit 27' is supplied from the main keyboard 12 through the general interface cable 14', the ten key portion 26' and the general interface cable 14 by a method similar to those employed in the first and second embodiments.

A high-speed infrared wireless connection may be established as an alternative to the method of connection between the multimedia key unit 27' and the ten key portion 26', by providing an infrared light emitting portion and an infrared light receiving portion on a side surface portion of each of the units. Further, a radio wave wireless connection may be established by providing an antenna therein. In such an alternative, an independent power supply, such as a battery or a solar cell, is further provided in the multimedia key unit 27'.

A fitting means (not shown) is provided in a side surface portion of each of the multimedia key unit 27' and the ten key portion 26'. Similarly as in the case of the first and second embodiments, the unit 27' and the portion 26' can be fixed to each other by using the fitting means. Furthermore, connectors for the fitting means and the general interface cable may be provided at plural places on each of the multimedia key unit 27' and the ten key portion 26'. Thus, the degree of flexibility in connection and placement of each of the units increases. Moreover, the bonding means, such as a magnet, adhesive tape, Velcro tape, or a suction cup may be used as an alternative to the fitting means.

The multimedia key unit 27' is easily detached from the ten key portion 26' by releasing the connection established by the fitting means and the general interface cable 14'.

Figure 12:
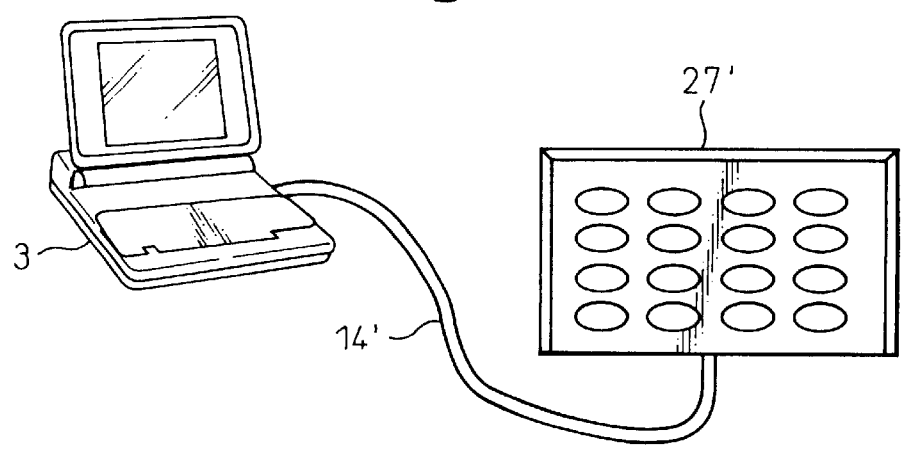
FIG. 12 is a diagram illustrating the connection between a multimedia key unit and a notebook-sized personal computer.

FIG. 12 is a diagram illustrating the connection between the multimedia key unit and the notebook-sized personal computer.

The multimedia key unit 27' of this embodiment contains the keyboard encoder IC and the keyboard matrix, independent of the ten key portion 26'. Thus, after the connection between the ten key portion 26' and the multimedia key unit 27' is released, the multimedia key unit 27' may be connected to an existing notebook-sized personal computer 3 through the general interface cable 14', so that the multimedia key function is easily achieved. Thus, according to this embodiment of the present invention, the multimedia key unit is effectively utilized.

The operating principle of the multimedia key unit of this embodiment is similar to that illustrated in FIG. 10. That is, when a key in the multimedia key unit 27' is depressed, a key code corresponding to the depressed key is posted to the host through the general interface cable 14', the ten key portion 26', and the general interface cable 14. The processing to be then performed in the host is similar to that in the case of the second embodiment.

Incidentally, in the case of connecting the multimedia key unit 27' of this embodiment to an existing notebook-sized personal computer 3, as shown in FIG. 12, a keyboard driver, a multimedia function table, and setting information are preliminarily installed in a host of the notebook-sized personal computer 3.

A fourth embodiment of the present invention is obtained by constituting the ten key unit or the multimedia key unit of each of the aforementioned embodiments by a flexible sheet keyboard unit.

Figure 13A:
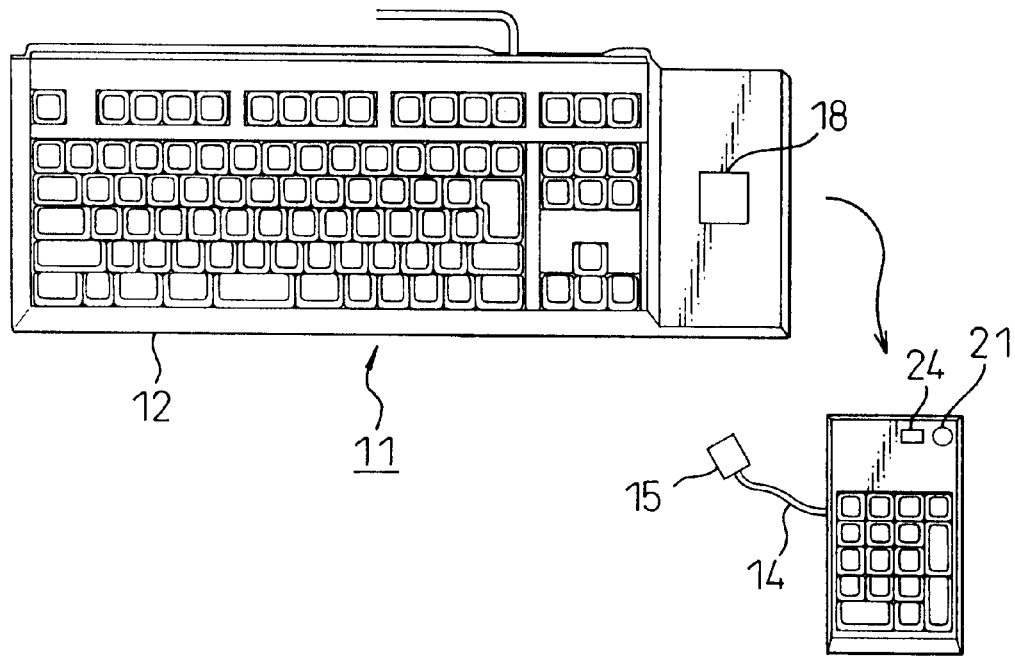
FIGS. 13a and 13b are diagrams illustrating a fourth embodiment of the present invention.
Figure 13B:
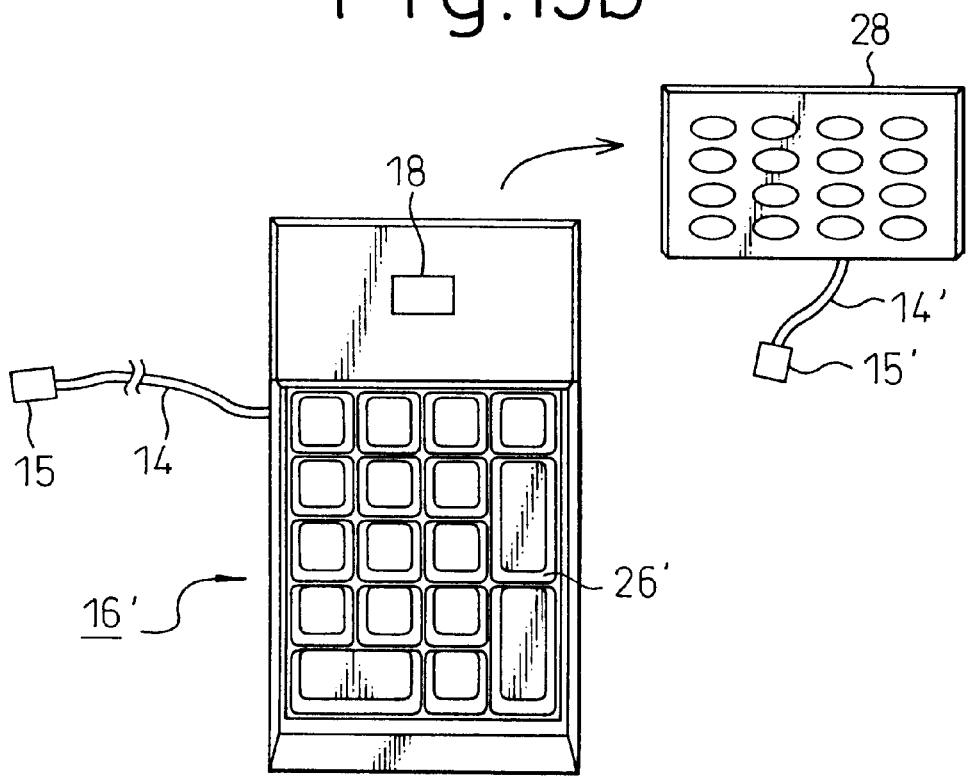

FIGS. 13a and 13b are diagrams each illustrating the fourth embodiment of the present invention.

FIG. 13a illustrates an alternative, which is obtained by constituting a ten key unit 17 by a thin flexible sheet keyboard unit, to the multimedia keyboard of the first embodiment of the present invention. The ten key unit 17 of this embodiment has a mode switching key 21 and an LED 24, which are provided on the surface portion thereof, and contains a keyboard matrix (not shown). The keyboard encoder IC is provided in the connector 15 for the general interface cable 14.

The bonding means 18, such as a magnet, adhesive tape, Velcro tape, or a suction cup, is provided in each of a back-face portion (not shown) of the ten key unit 17 and a part, in which the ten key unit 17 is provided, of the main keyboard unit. The ten key unit 17 is connected to the main keyboard unit 12 by this bonding means 18 and the general interface cable 14.

The remaining constitution, and the operation of use of this embodiment is similar to those of the first embodiment. Further, after the connection between the ten key portion 17 and the main keyboard unit is released, only the ten key unit 17 may be connected to an existing notebook-sized personal computer through the general interface cable 14, so that the multimedia key function is easily achieved. Furthermore, if adhesive tape is used as the bonding means 18, the adhesive tape can be made to adhere to an arbitrary place on the surface portion of the notebook-sized personal computer. Consequently, a multimedia keyboard is realized, allowing a saving in space.

FIG. 13b illustrates an auxiliary keyboard unit obtained by constituting the multimedia key unit 28 by a thin flexible sheet keyboard unit as an alternative to the multimedia key unit of the third embodiment. The multimedia key unit 28 of the fourth embodiment has multimedia keys provided on the surface portion thereof and contains a keyboard matrix (not shown), as in the case of the third embodiment. A keyboard encoder IC is constituted in a connector 15' for a general interface cable 14'.

The bonding means 18, such as a magnet, adhesive tape, Velcro tape, or a suction cup, is provided in each of a back-face portion (not shown) of the multimedia key unit 28 and a part, in which the multimedia key unit 28 is provided, of the ten key portion 26'. The multimedia key unit 28 is connected to the ten key portion 26' by this bonding means 18 and the general interface cable 14'.

The remaining constitution, and the operation of use of the fourth embodiment is similar to those of the third embodiment. Further, after the connection between the multimedia key unit 28 and the ten key portion 26' is released, only the multimedia key unit 28 may be connected to an existing notebook-sized personal computer through the general interface cable 14', so that the multimedia key function is easily achieved. Furthermore, if adhesive tape is used as the bonding means 18, the adhesive tape can be made to adhere to a given place on the surface portion of the notebook-sized personal computer. Consequently, the multimedia keyboard of the fourth embodiment can save more space.

Additionally, the entire ten key unit 16' may be constituted by a thin flexible sheet keyboard. In this case, the keyboard encoder IC and so on are contained in connectors respectively attached to the multimedia key unit and the ten key portion.

Figure 14:
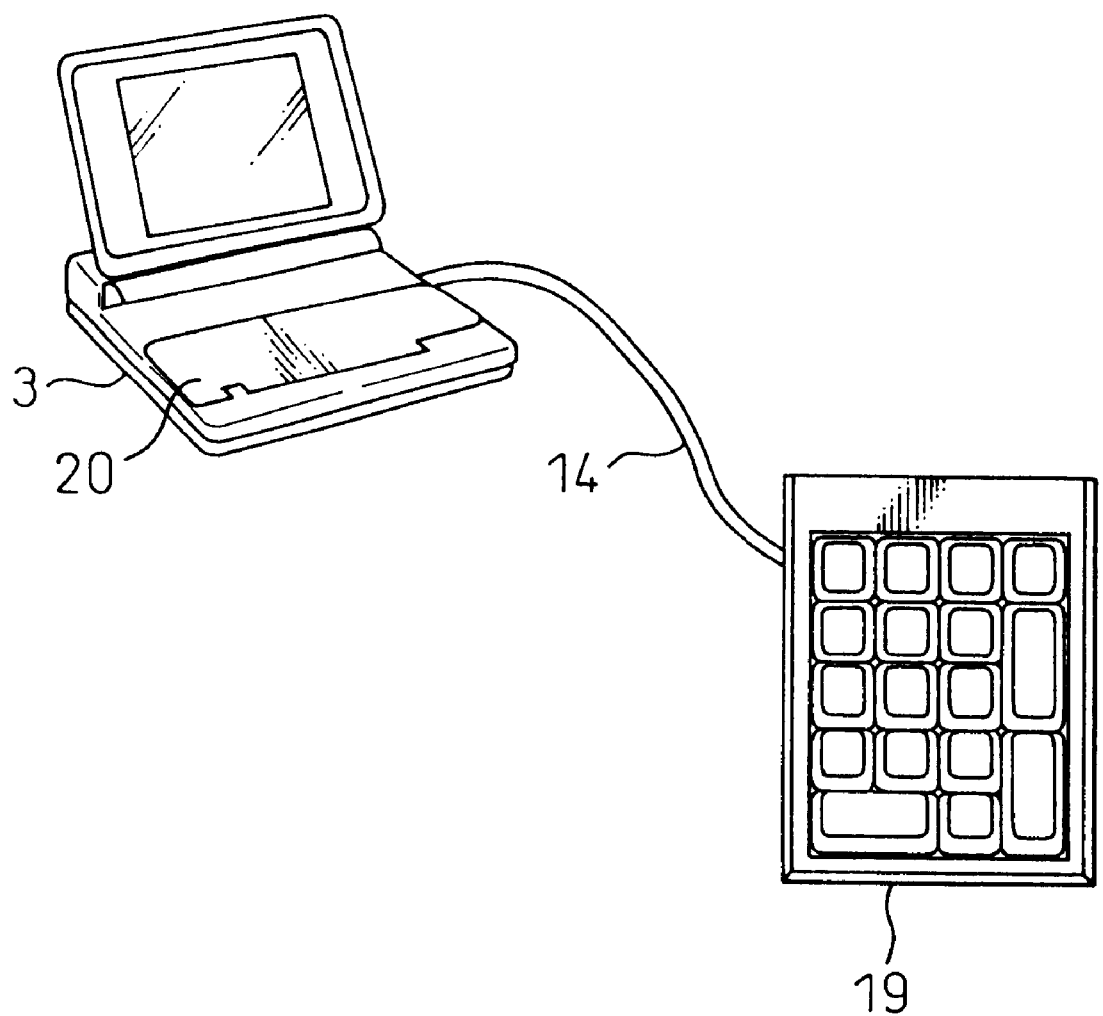
FIG. 14 is a diagram illustrating a fifth embodiment of the present invention.

A fifth embodiment of the present invention is adapted to realize a multimedia key function by using an ordinary ten key unit externally attached thereto. FIG. 14 is a diagram illustrating the fifth embodiment of the present invention.

According to this embodiment, in the case that an ordinary ten keyboard 19 to be externally attached to a computer is connected to a notebook-sized personal computer 3 through a general interface cable 14, a multimedia keyboard driver having a multimedia operation mode in addition to a ten key operation mode, which the ten keyboard 19 originally has, is loaded into a host 5. The state of the operation mode is displayed on the screen of a display device.

The operation mode of the ten keyboard 19 of this embodiment is switched by depressing one of keys of the ten keyboard 19 or a main keyboard unit 20 of the notebook-sized personal computer 3. For instance, in the case of switching the operation mode of the ten key unit 19 by depressing a key provided on the main keyboard unit 20, it is sufficient to preliminarily set an "FP" key or a combination of a "Shift" key and an "M" key as a mode switching key. Information indicating this setting is stored in a rewritable storage medium provided in the host.

In the case of this embodiment, regardless of which of the ten key operation mode and the multimedia operation mode is the operation mode in which the keyboard is placed, only ten key codes are employed as key codes to be posted from the ten keyboard 19 to the host. Further, processing to be performed is determined from the operation mode of the ten keyboard 19 and the ten key code outputted therefrom by the multimedia keyboard driver loaded into the host.

Furthermore, a multimedia function table containing the definitions or description of the multimedia functions, which can be performed in the multimedia operation mode, is similar to that of FIG. 7 and is saved in a rewritable storage medium in the host, as in the case of the first embodiment. Further, because of the fact that only ten key codes are employed as key codes to be outputted from the ten keyboard 19 to the host, function operations are stored therein in such a manner as to be linked with the ten key codes. The function operations can be added or deleted by exchanging a ROM or by being edited with the aid of software programs. The multimedia function table is read from the storage medium at each activation of the system. The function operations defined in the table at that moment are effective.

Moreover, in the rewritable storage medium in the host, setting information concerning the ten key operation mode and the multimedia operation mode of the ten keyboard 19 is saved in addition to the aforementioned mode switching key setting information and the multimedia function table. In the case of this embodiment, an operation mode to be activated at the time of turning on the system power supply can be set.

Figure 15:
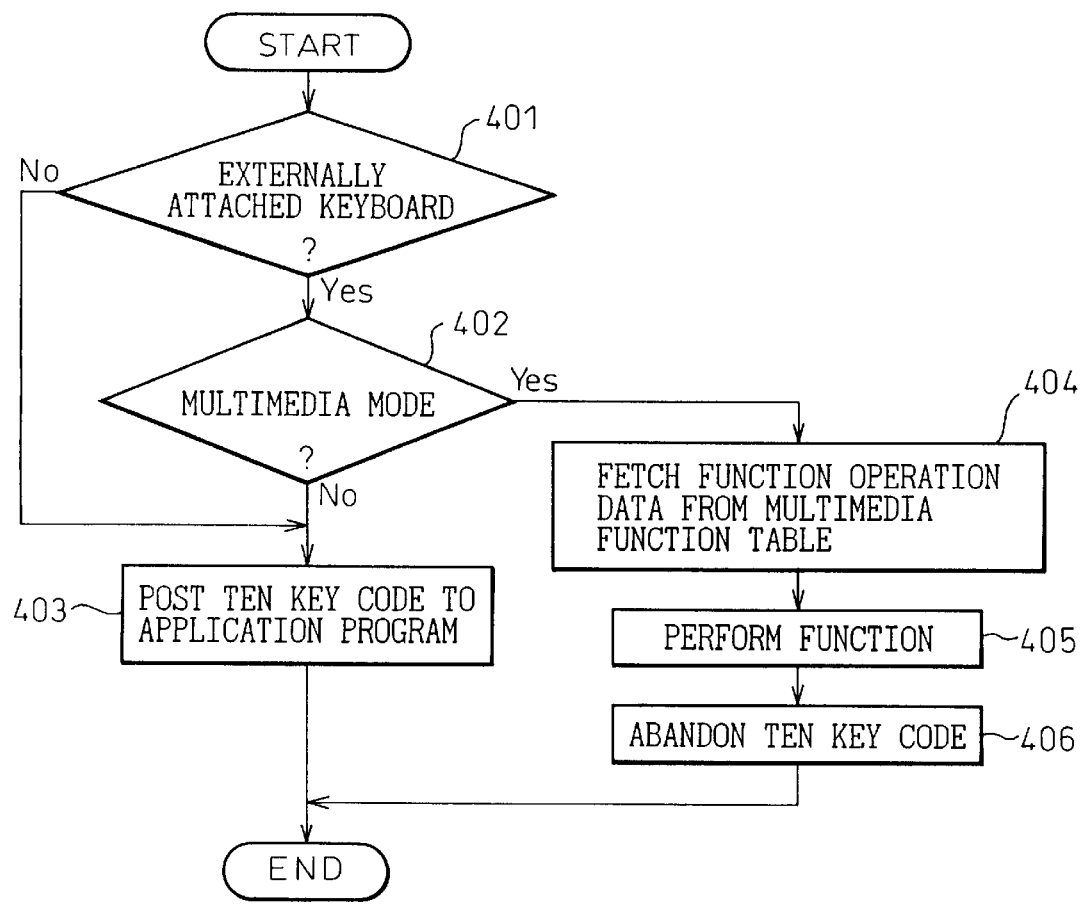
FIG. 15 is a flowchart illustrating an operation of the fifth embodiment of the present invention.

FIG. 15 is a flowchart illustrating an operation of the fifth embodiment of the present invention.

First, when the multimedia keyboard driver loaded in the host receives a ten key code at step 401, it is determined which of the main keyboard unit 12 and the ten keyboard 19 outputs the ten key code. If the keyboard units are USB keyboards, a product ID included in the ten key code is used for determining the keyboard unit having outputted the ten key code.

If it is decided in step 401 that the ten key code is outputted from the main keyboard unit 12, this means that a ten key arranged on the main keyboard unit 12 is depressed for the original purpose of the ten key. Thus, the ten key code is posted to an application program (in step 403), just as it is.

Conversely, if it is decided in step 401 that the ten key code is outputted from the ten keyboard 19, control advances to step 404.

At step 404, corresponding function data is read from the multimedia function table. Then, at step 405, a corresponding function is performed according to the function data in the host.

Further, the ten key code received at that time is not used for the original purpose of the ten key, so that this ten key code is abandoned (at step 406).

As described above, according to the present invention, the unit having the multimedia key function is detachable from the keyboard. Thus, for example, when the multimedia key function is not utilized, such a unit may be detached therefrom, if necessary. Consequently, space-saving is achieved.

Furthermore, the unit having the multimedia key function is effectively utilized by being connected to a notebook-sized personal computer. Thus, the keyboard of the present invention is very efficient.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A keyboard comprising:

a main keyboard unit;

an auxiliary keyboard unit having a multimedia key function, through which various functions, which can be realized by using a computer, and execution of application programs, which can be executed by using said computer, are directly achieved by a key operation as multimedia functions; and a general interface to connect said main keyboard and said auxiliary keyboard detachably, wherein said auxiliary keyboard can provide an additional computer with the multimedia key function when said auxiliary keyboard is disconnected from said main keyboard and then said auxiliary keyboard is directly connected via said general interface to said additional computer which is different form said computer.

2. The keyboard according to claim 1, wherein said auxiliary keyboard unit has an ordinary operation mode for ordinary keying, and a multimedia key operation mode to perform the multimedia key function, and wherein said auxiliary keyboard unit comprises:

ten keys;

a mode switching key to switch an operation mode between the ordinary operation mode and the multimedia key operation mode; and key code output device to post a ten key code to said computer in the ordinary operation mode when said mode switching key is depressed, and to post a multimedia key code to said computer in the multimedia key operation mode when said mode switching key is depressed.

3. The keyboard according to claim 2, wherein said auxiliary keyboard unit further comprises an indication device for indicating which of the ordinary operation mode and the multimedia key operation mode is the operation mode in which said auxiliary keyboard unit is placed.

4. The keyboard according to claim 2, wherein said auxiliary keyboard unit further comprises a posting device for indicating on a screen, of a display device for said computer in which of the ordinary operation mode and the multimedia key operation mode said auxiliary keyboard unit is placed.

5. The keyboard according to claim 1, wherein said auxiliary keyboard comprises:

ten keys;

at least one multimedia key for the multimedia key function;

multimedia key code output device to post a multimedia key code to said computer when said multimedia key is depressed; and ten key code output device to post a ten key code to said computer when one of said ten keys is depressed.

6. The keyboard according to claim 5, wherein said auxiliary keyboard unit comprises:

a multimedia key unit having said multimedia key; and a main ten key unit having said ten key, and wherein said multimedia key unit and said main ten key unit are detachable through a general interface.

7. The keyboard according to claim 6, wherein each of said multimedia key unit and said main ten key unit has a second fitting device, and wherein said multimedia key unit and said main ten key unit are adapted to be able to be mechanically connected to each other by using said second fitting device.

8. The keyboard according to claim 1, wherein each of said auxiliary keyboard unit and said main keyboard unit has a first fitting device, and wherein said auxiliary keyboard unit and said main keyboard unit are adapted to be able to be mechanically connected to each other by using said first fitting device.

9. The keyboard according to claim 1, wherein said auxiliary keyboard unit is constituted by a flexible sheet keyboard unit.

10. The keyboard according to claim 9, wherein each of said auxiliary keyboard unit and said main keyboard unit has an adhesive device.

11. A keyboard system comprising:

a computer and a keyboard having a main keyboard unit, and an auxiliary keyboard unit having a multimedia key function, through which various functions, which can be realized by using said computer, and execution of application programs, which can be executed by using said computer, are directly achieved by a key operation as multimedia functions, and wherein said auxiliary keyboard unit is detachable from said main keyboard unit, and wherein said auxiliary keyboard unit has an ordinary operation mode for ordinary keying, and a multimedia key operation mode for use in performing the multimedia key function, and wherein said auxiliary keyboard unit comprises ten keys, a mode switching key for switching an operation mode between the ordinary operation mode and the multimedia key operation mode, and key code output device for posting a ten key code to said computer in the ordinary operation mode when said ten key is depressed, and for posting a multimedia key code to said computer in the multimedia key operation mode when said ten key is depressed, wherein said computer has a multimedia function table, in which the multimedia functions corresponding to the multimedia key codes are defined, and wherein the multimedia function corresponding to a posted one of the multimedia key codes is read from the multimedia function table and performed.

12. The keyboard system according to claim 11, wherein the multimedia function table is saved in a rewritable storage medium in said computer, and wherein when a power supply for said computer is turned on, the multimedia function table is read from said storage medium to a CPU of said computer, and the definitions in the multimedia function table become effective.

13. The keyboard system according to claim 11, wherein setting information on which of the ordinary operation mode and the multimedia key operation mode becoming effective immediately upon completion of turning on a power supply for said computer is saved in a rewritable storage medium in said computer, and wherein when a power supply for said computer is turned on, the multimedia function table is read from said storage medium to a CPU of said computer, and the definitions in the multimedia function table become effective.

14. The keyboard system according to claim 11, wherein said auxiliary keyboard unit is directly connected to said computer through a general interface cable.

15. A keyboard system comprising:

a computer and a keyboard having a main keyboard unit, and an auxiliary keyboard unit having a multimedia key function, through which various functions, which can be realized by using said computer, and execution of application programs, which can be executed by using said computer, are directly achieved by a key operation as multimedia functions, and wherein said auxiliary keyboard unit is detachable from said main keyboard unit, and wherein said auxiliary keyboard comprises ten keys, at least one multimedia key for the multimedia key function, multimedia key code output device for posting a multimedia key code to said computer when said multimedia key is depressed, and ten key code output device for posting a ten key code to said computer when said ten key is depressed, wherein said computer has a multimedia function table, in which the multimedia functions corresponding to the multimedia key codes are defined, and wherein the multimedia function corresponding to a posted one of the multimedia key codes is read from the multimedia function table and performed.

16. The keyboard system according to claim 15, wherein the multimedia function table is saved in a rewritable storage medium in said computer, and wherein when a power supply for said computer is turned on, the multimedia function table is read from said storage medium to a CPU of said computer, and the definitions in the multimedia function table become effective.

17. A keyboard comprising:

a main keyboard unit;

an auxiliary keyboard unit having multimedia key functions; and a general interface to connect said main keyboard and said auxiliary keyboard detachably, wherein said auxiliary keyboard can provide an additional computer with said multimedia key functions.

* * * * *